United States Patent [19]
Tull

[11] Patent Number: 4,877,155
[45] Date of Patent: Oct. 31, 1989

[54] SPILL PROTECTING APPARATUS

[75] Inventor: Richard H. Tull, Marietta, Ga.

[73] Assignee: MGM Petro Equipment & Enviro Services, Inc., Lakeland, Fla.

[21] Appl. No.: 235,300

[22] Filed: Aug. 23, 1988

[51] Int. Cl.[4] .......................... B67D 5/00; F16N 33/00

[52] U.S. Cl. .................................... 222/108; 222/527; 141/332; 210/248; 184/1.5; 184/88.2

[58] Field of Search ................ 210/238, 248; 141/331, 141/332, 340; 184/1.5, 88.2; 222/108, 109, 461, 464, 527

[56] References Cited

U.S. PATENT DOCUMENTS

| | | | |
|---|---|---|---|
| D. 241,597 | 9/1976 | Confer et al. | 141/331 |
| 664,991 | 1/1901 | Caswell | 222/108 |
| 1,190,713 | 7/1916 | Bokop . | |
| 1,935,324 | 11/1933 | Lillard | 226/38 |
| 2,629,377 | 2/1953 | Parks | 128/227 |
| 2,682,984 | 7/1954 | Melikian et al. | 222/108 |
| 3,986,538 | 10/1976 | Sather | 141/332 |
| 4,114,783 | 9/1978 | Wempe et al. | 222/464 |
| 4,245,666 | 1/1981 | Norris | 137/357 |
| 4,376,703 | 3/1983 | Krauss | 222/108 |
| 4,451,368 | 5/1984 | Pandelena et al. | 210/238 |
| 4,501,305 | 2/1985 | Zola et al. | 141/86 |
| 4,763,620 | 8/1988 | Zastocki | 184/88.2 |
| 4,773,177 | 9/1988 | Gray, II et al. | 43/1 |

*Primary Examiner*—Joseph J. Rolla
*Assistant Examiner*—Steven Reiss
*Attorney, Agent, or Firm*—Pettis & McDonald

[57] ABSTRACT

Apparatus is described for preventing spillage of liquids from a dispensing pump during changing of a filtering element that is removably attached to a mount on the pump. The apparatus includes a hollow member that is receivable over a filtering element and a portion of its mount. A constricting element engages the mount and supports the upper end of the apparatus. A flexible liquid conduit extending downwardly from the hollow member and an anchoring element attached to the lower end of the conduit to assist in maintaining the liquid conduit in a predetermined position during the changing of a filtering element.

4 Claims, 1 Drawing Sheet

SPILL PROTECTING APPARATUS

BACKGROUND OF THE INVENTION

This invention relates generally to apparatus for dispensing liquids. More particularly, it relates to apparatus used in connection with liquid dispensing pumps, which pumps include replaceable filtering elements. Even more particularly, this invention relates to apparatus for preventing spillage of liquids from such pumps during the changing of a filtering element attached to such pump.

In many dispensing pumps, particularly those used for dispensing gasoline, it is now common practice to include replaceable filter elements. These filter elements conventionally are located on the side of the pumping apparatus and must be changed periodically to maintain proper filtering protection. The filtering elements conventionally are removably attached to a mount extending out from the side of such a pump and may be attached to such mount either by screw threads or by clamps.

To protect the purity of the liquid dispensed by the pump, it is necessary that the filtering element be replaced at periodic intervals. Some liquids dispensed by such pump present sufficient potential danger either to safety or to the environment that they must be contained and spillage prevented. One example of this requirement is with gasoline pumps, where substantial spillage may pose both an environmental hazard and a potential fire hazard. In several known instances pumps dispensing such liquids have experienced major spills during the time that the filtering elements were being changed on the pumps. This can occur when the pumps are inadvertently activated at a time that a filter element is not in place or simply by the liquid contained within the filter element itself. Such dangers have prompted a search for means to prevent such unintentional spillage and the dangers that it presents.

SUMMARY OF THE INVENTION

In order to help prevent the problems experienced with such spillage, this invention provides apparatus for preventing such spillage during the changing of filtering elements that are removably attached to a mount on a dispensing pump. This apparatus includes a hollow member elongated in an axial direction and formed of a liquid tight, flexible, petroleum resistant material, which member has an upper open axial end and a lower open axial end distal the upper end, the upper end being of sufficient area transverse to the axial direction to fit over the filtering element and including an open interior of sufficient length and cross sectional area transverse to the axial direction to receive a filtering element completely therewithin. Constricting means engages the upper open end of the hollow member for contracting the hollow member upper open end about the filtering element mount to support the hollow member on the mount, and a flexible liquid conduit has a first end and a second end spaced from the first end, with the first end being connected to the lower open end of the hollow member and the conduct extending downwardly therefrom so that liquid introduced into the hollow member will flow by gravity out the lower open end of the hollow member and down the liquid conduit. Anchoring means are attached to a lower end of the liquid conduit to assist in maintaining the liquid conduit lower end in a predetermined position, to resist movement during the changing of a filtering element.

BRIEF DESCRIPTION OF THE DRAWING

A preferred embodiment of the present invention is illustrated in the drawings in which.

DETAILED DESCRIPTION OF A PREFERRED EMBODIMENT

Figure 1:
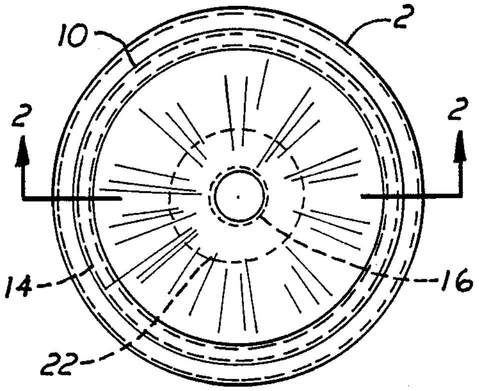
FIG. 1 is a top view of the apparatus of this invention as attached to a filtering element mount on a dispensing pump.
Figure 2:
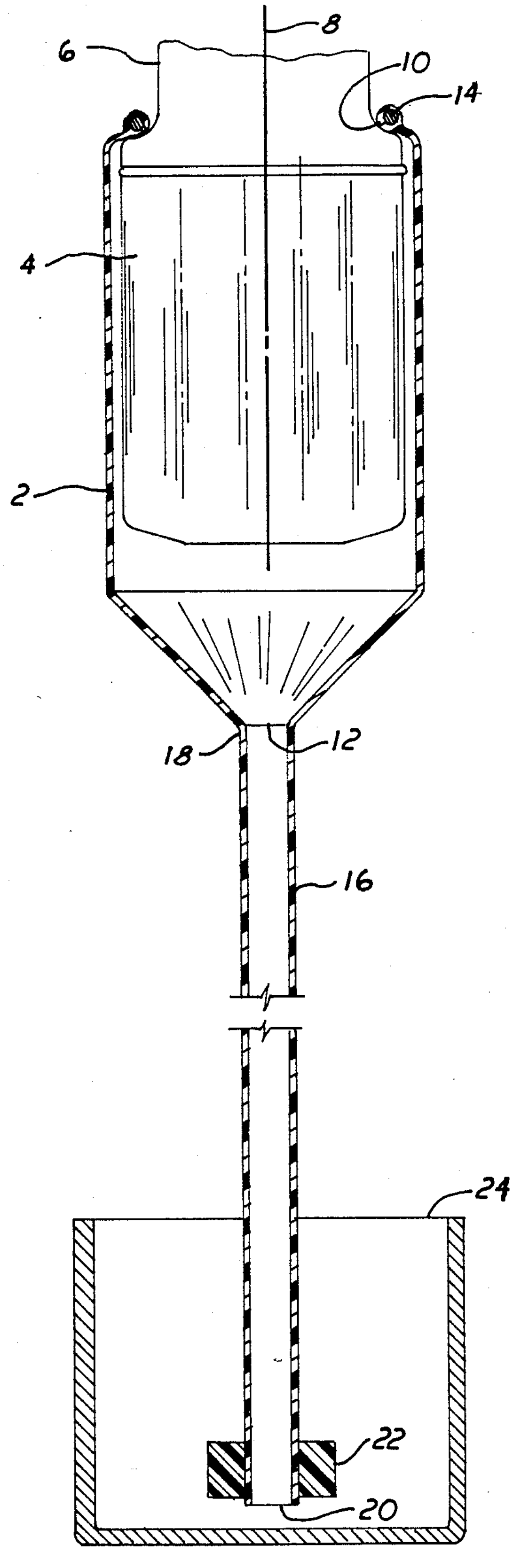
FIG. 2 is a side sectional view, taken along lines 2—2 of the apparatus of FIG. 1.

A preferred embodiment of the spill preventing apparatus of this invention is illustrated in the top view of FIG. 1 and the side section view of FIG. 2. This apparatus includes a hollow member 2 that may suitably be in the form of a generally cylindrical member having an axis 8. This hollow member is elongated in an axial direction, the vertical direction in FIG. 2, and is formed of a liquid tight, flexible, petroleum resistant material. One preferred material is a woven, coated polyethylene material, such as that sold by Shintoa under the trade name MAI-WEAVE.

This hollow member 2 is illustrated surrounding and engaging a filtering element 4 that is attached to a mount 6 which, in turn, is attached to a liquid pump, such as a gasoline pump. This filtering element 4 is conventionally of a generally cylindrical configuration and typically is attached to the mount 6 by threading onto that mount by rotation of the filtering element about an axis 8.

The hollow member 2 is elongated in the direction of the axis 8 and is formed of a liquid tight, flexible, petroleum resistant material. The hollow member 2 has an upper open axial end 10 and a lower open axial end 12 distal the upper open axial end. The upper open axial end is of sufficient area, in a direction transverse to the axis 8, to fit over the filtering element 4 and has an open interior of sufficient length and cross sectional area transverse to that axis to receive the filtering element 4 completely therewithin. Suitable constricting means 14, typically an elastic member of synthetic resin or an extension spring, or even a drawstring, is provided engaging the upper open axial end of the hollow member 2 for contracting that hollow member upper open axial end about the filtering element mount 6 in the manner shown in FIG. 2. This constricting means enables the upper open end of the hollow member 2 to be slipped over the filtering element and partially over the mount 6 and then engage the mount 6 to support the member 2 on the mount, as shown. Connected to the lower open end 12 of the hollow member 2 is a flexible liquid conduit 16 having a first or upper end 18 and a second or lower end 20. The first end 18 is connected to the lower open end 12 of the hollow member 2 and extends downwardly therefrom. This conduit may be formed of the same material as comprises the hollow member 2 and may either be formed integrally therewith or may be attached to the lower portion of that member 2.

Attached to the lower end 20 of the liquid conduit are anchoring means 22 to assist in maintaining the lower end of the liquid conduit in a predetermined position. This anchor means 22 may suitably be in the form of a weight, which could be formed of metal or any other suitably dense material, or could conveniently comprise a clamping member that may be affixed to a container, such as the container 24 illustrated.

With the basic structure of this spill preventing apparatus having been described above, its manner of operation may now be understood as follows. When it is desired to change the filtering element 4 that is attached to the mount 6 forming a portion of the liquid pump, the hollow member 2 is placed over the filtering element 4 and the lower portion of the mount 6. Then, under the force of elasticity, or by the use of a drawstring, the constrict element 14 is drawn around the shoulder on that filter mount to support the spill preventing apparatus during the changing of the filtering element. Next the filtering element 4 is removed from the mount 6, suitably by unscrewing or by releasing any necessary clamps. When this filtering element 4 is released from the mount 6, any liquid, such as gasoline, that is introduced into the hollow member 2, as by spillage, will flow by gravity out the lower open end 12 of the hollow member and down the conduit 16 to be caught within the container 24. During this time the anchoring means 22 serves to keep the lower end of that conduit 16 within the container, despite jostling of the spill catching apparatus or the effects of wind or the like. When the filtering element 14 is fully released from the mount 6, the spill catching apparatus may be slipped off of the mount momentarily to remove the spent filtering element 4 and a new filtering element 4 may then by attached to the pump. Thus, by use of the apparatus of this invention any spillage, such as typically occurs during the release of a spent filtering element 4 is contained within that apparatus and the receptacle or container 24 that is used therewith.

While the foregoing describes a particularly preferred embodiment of the apparatus of this invention, it is to be understood that this description and the illustration is indicative only of the principles of the invention and is not to be considered limitative thereof. Accordingly, because numerous variations and modifications of the invention, all within the scope of the invention, will readily occur to those skilled in the art, the scope of the invention us to be limited solely by the claims appended hereto.

What is claimed is:

1. Apparatus for preventing spillage of liquids from a dispensing pump during the changing of a filtering element removably attached to a mount on such pump, comprising a hollow member elongated in an axial direction and formed of a liquid-tight, flexible, petroleum resistant material, said member having an upper open end and a lower open end distal said upper open end, said upper open end of sufficient area transverse to said axial direction to fit over said filtering element and having an open interior of sufficient length and cross sectional are a transverse to said axial direction to receive said filtering element completely therewithin;

constricting means engaging said upper open end of said hollow member for contracting said hollow member upper open end about said filtering element mount to support said hollow member on said mount, whereby the hollow member will be supported on the mount during the changing of the filtering element;

a flexible liquid conduit having a first end and a second end spaced from said first end, said first end being connected to said lower open end of said hollow member and said conduit extending downwardly therefrom, whereby liquid introduced into the hollow member will flow by gravity out the lower open end of the hollow member and down the liquid conduit; and anchoring means attached to a lower end of said liquid conduit to assist in maintaining said liquid conduit lower end in a predetermined position within a receiving container, whereby the liquid conduit and anchor means will resist movement relative to the container during the changing of the filtering element.

2. The apparatus of claim 1 wherein said constricting means comprises a resilient elastic member urging said hollow member upper open end toward a contracted condition for engaging said filtering element mount.

3. The apparatus of claim 1 wherein said material forming said hollow member comprises a woven polyethylene material having a petroleum resistant coating.

4. The apparatus of claim 1 wherein said anchoring means comprises a weighting member, whereby the lower end of the liquid conduit may be placed within said container to receive any liquid flowing therethrough with the weighting member holding the lower end of the liquid conduit in place in the container.

* * * * *